(12) United States Patent
Hamilton et al.

(10) Patent No.: US 12,115,948 B2
(45) Date of Patent: Oct. 15, 2024

(54) SENSOR ASSEMBLY WITH CLEANING

(71) Applicant: Ford Global Technologies, LLC, Dearborn, MI (US)

(72) Inventors: Tyler D. Hamilton, Farmington, MI (US); Kunal Chaudhari, Westland, MI (US); Venkatesh Krishnan, Canton, MI (US); Anthony Michael Regalbuto, Highland, MI (US); Subba Reddy Boggu, Andhra Pradesh (IN)

(73) Assignee: Ford Global Technologies, LLC, Dearborn, MI (US)

( * ) Notice: Subject to any disclaimer, the term of this patent is extended or adjusted under 35 U.S.C. 154(b) by 282 days.

(21) Appl. No.: 17/505,676

(22) Filed: Oct. 20, 2021

(65) Prior Publication Data
US 2023/0120545 A1 Apr. 20, 2023

(51) Int. Cl.
*B60S 1/54* (2006.01)
*B60S 1/56* (2006.01)

(52) U.S. Cl.
CPC .. *B60S 1/54* (2013.01); *B60S 1/56* (2013.01)

(58) Field of Classification Search
CPC ...... B60S 1/54; B60S 1/56; A47L 9/08; A47L 9/2805; A47L 9/2842; A47L 9/2847; A47L 9/0488; B60R 11/00; B60R 2011/004; G05D 1/0227; G05D 1/0238; G05D 2201/0203
USPC .......................................................... 15/313
See application file for complete search history.

(56) References Cited

U.S. PATENT DOCUMENTS

| 10,675,945 | B2 | 6/2020 | Lombrozo et al. |
| 2005/0166809 | A1* | 8/2005 | Sixsmith ............... F04D 29/441 |
| | | | 110/160 |
| 2015/0151722 | A1* | 6/2015 | Gokan ................... H04N 23/51 |
| | | | 134/198 |
| 2019/0008345 | A1* | 1/2019 | Schmidt ................... A47L 9/08 |
| 2021/0003669 | A1 | 1/2021 | Diehl et al. |
| 2021/0063093 | A1 | 3/2021 | Tobiassen et al. |
| 2021/0088669 | A1 | 3/2021 | Li et al. |

FOREIGN PATENT DOCUMENTS

EP 3481683 B1 10/2020

* cited by examiner

*Primary Examiner* — Katina N. Henson
(74) *Attorney, Agent, or Firm* — Frank A. MacKenzie; Bejin Bieneman PLC

(57) ABSTRACT

A sensor assembly includes a sensor including a cylindrical sensor window defining an axis, a cover fixed relative to the sensor, and a duct mounted to the sensor and extending through the axis. The cover is positioned to expose a circumferential portion of the sensor window. The circumferential portion extends circumferentially relative to the axis from a first end adjacent to the cover to a second end adjacent to the cover. The circumferential portion includes a midpoint circumferentially between the first end and the second end. The duct includes an inlet and an outlet. The outlet extends circumferentially from the first end of the circumferential portion to the second end of the circumferential portion. The duct includes a deflector positioned to direct airflow from the inlet to the outlet at the first end and second end of the circumferential portion before the airflow reaches the midpoint of the circumferential portion.

15 Claims, 6 Drawing Sheets

SENSOR ASSEMBLY WITH CLEANING

BACKGROUND

Autonomous vehicles include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back.

DETAILED DESCRIPTION

Figure 1:
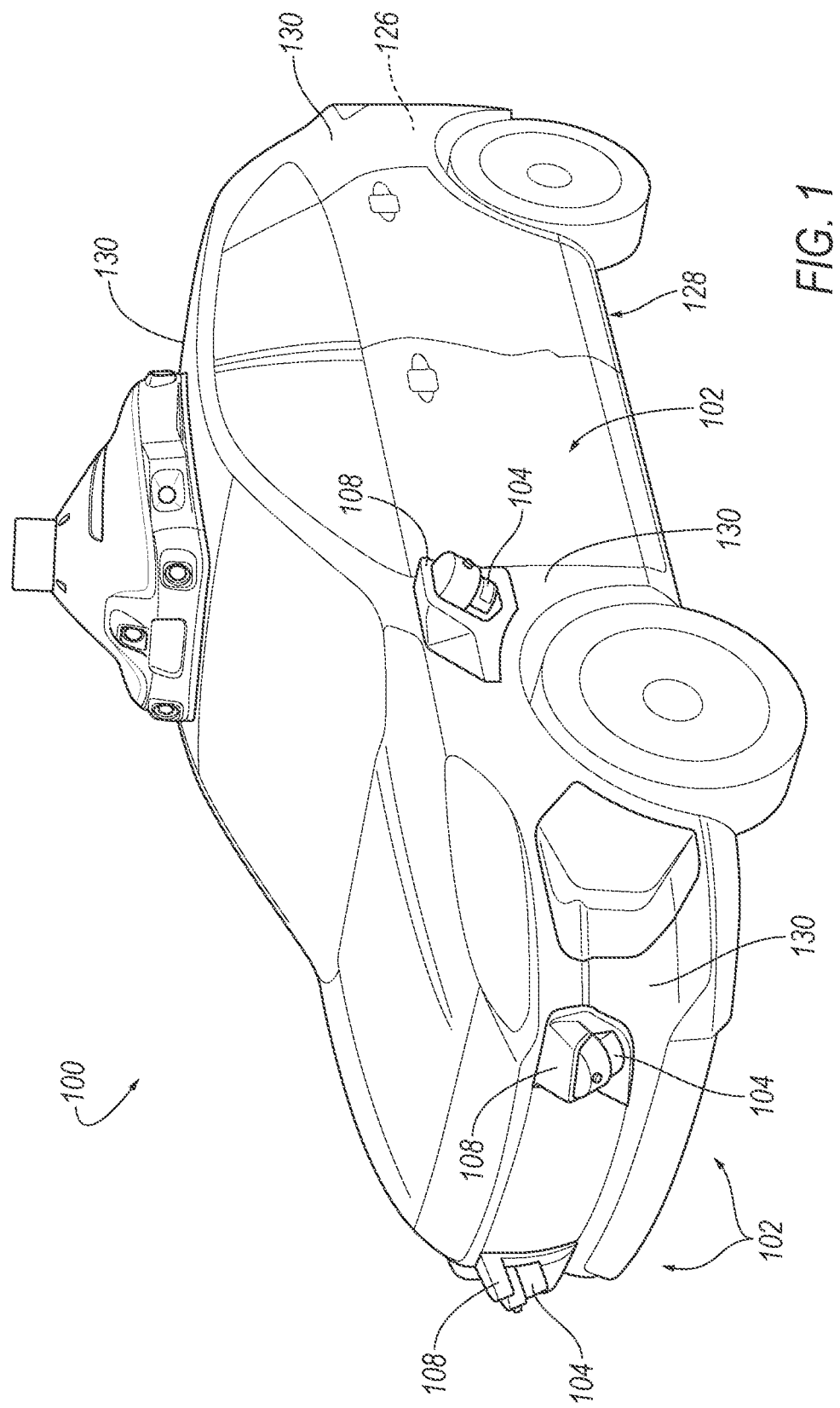
FIG. 1 is a perspective view of an example vehicle with sensor assemblies.

A sensor assembly includes a sensor including a cylindrical sensor window defining an axis, a cover fixed relative to the sensor, and a duct mounted to the sensor and extending through the axis. The cover is positioned to expose a circumferential portion of the sensor window. The circumferential portion extends circumferentially relative to the axis from a first end adjacent to the cover to a second end adjacent to the cover. The circumferential portion includes a midpoint circumferentially between the first end and the second end. The duct includes an inlet and an outlet. The outlet extends circumferentially from the first end of the circumferential portion to the second end of the circumferential portion. The duct includes a deflector positioned to direct airflow from the inlet to the outlet at the first end and second end of the circumferential portion before the airflow reaches the midpoint of the circumferential portion.

The sensor assembly may further include a bracket and a plurality of fasteners fixing the sensor and the duct to the bracket. The fasteners may extend through the duct. The deflector may be positioned to direct the airflow around the fasteners. The fasteners may include a first fastener, a second fastener, and a third fastener; the deflector may include a first flat side extending from the third fastener to the first fastener and positioned to direct airflow to the outlet at the first end of the circumferential portion before the airflow reaches the midpoint of the circumferential portion; and the deflector may include a second flat side extending from the third fastener to the second fastener and positioned to direct airflow to the outlet at the second end of the circumferential portion before the airflow reaches the midpoint of the circumferential portion.

The bracket may extend through the axis, and the bracket is positioned between the sensor and the duct along the axis. The sensor may be a first sensor, the outlet may be a first outlet, the sensor assembly may further include a second sensor mounted to the bracket, and the duct may include a second outlet positioned to direct airflow to the second sensor. The second sensor may be positioned on an opposite side of the bracket from the first sensor.

The second sensor may include a sensor lens, and the second outlet may be positioned to direct airflow across the sensor lens.

The sensor assembly may further include a blower mounted to the bracket and positioned to blow air into the inlet of the duct. The duct may be a first duct, the sensor assembly may further include a second duct, and the blower may be positioned to draw air from the second duct. The second duct may be mounted to the bracket.

The deflector may include a first flat side positioned to direct airflow to the outlet at the first end of the circumferential portion before the airflow reaches the midpoint of the circumferential portion, and the deflector may include a second flat side positioned to direct airflow to the outlet at the second end of the circumferential portion before the airflow reaches the midpoint of the circumferential portion. The deflector may include a third side curving circumferentially from the first flat side to the second flat side.

The sensor assembly may further include a blower positioned to blow air into the inlet of the duct. The duct may be a first duct, the sensor assembly may further include a second duct, and the blower may be positioned to draw air from the second duct. The inlet may be a first inlet, the outlet may be a first outlet, the second duct may extend from a second inlet to a second outlet, and the second outlet may be positioned to exhaust airflow into the blower. The second duct may have a smoothly curving shape from the second inlet to the second outlet.

The second duct may include a vane bisecting the duct from the second inlet to the second outlet.

The second duct may extend through the axis on an opposite side of the sensor as the first duct extends through the axis.

With reference to the Figures, wherein like numerals indicate like parts throughout the several views, a sensor assembly 102 for a vehicle 100 includes a first sensor 104 including a cylindrical sensor window 106 defining an axis A, a cover 108 fixed relative to the first sensor 104, and a first duct 110 mounted to the first sensor 104 and extending through the axis A. The cover 108 is positioned to expose a circumferential portion 112 of the sensor window 106. The circumferential portion 112 extends circumferentially relative to the axis A from a first end 114 adjacent to the cover 108 to a second end 116 adjacent to the cover 108. The circumferential portion 112 includes a midpoint 118 circumferentially between the first end 114 and the second end 116. The first duct 110 includes a first inlet 120 and a first outlet 122. The first outlet 122 extends circumferentially from the first end 114 of the circumferential portion 112 to the second end 116 of the circumferential portion 112. The first duct 110 includes a deflector 124 positioned to direct airflow from the first inlet 120 to the first outlet 122 at the first end 114 and second end 116 of the circumferential portion 112 before the airflow reaches the midpoint 118 of the circumferential portion 112.

The sensor assembly 102 can provide airflow through the first duct 110 to clean the circumferential portion 112 of the sensor window 106. The airflow from the first outlet 122 across the sensor window 106 can blow debris off of the sensor window 106 and can serve as an air curtain that prevents debris from contacting the sensor window 106. Because the deflector 124 directs the airflow passing through the first duct 110 to the first outlet 122 at the first end 114 and second end 116 of the circumferential portion 112 before that airflow reaches the first outlet 122 at the midpoint 118 of the circumferential portion 112, the airflow exiting the first outlet 122 can have high speed along an entirety of the first outlet 122, thereby preventing dead zones or low-speed areas at the first end 114 or second end 116 of the circumferential portion 112 of the first sensor 104. The deflector 124 can generate this benefit even if the circumferential portion 112 of the sensor window 106 extend circumferentially more than 180°. The cleaning benefits of the airflow can extend across an entire area of the circumferential portion 112 of the sensor window 106. The sensor assembly 102 can help provide a clear view for the first sensor 104 over a wide field of view.

With reference to FIG. 1, the vehicle 100 may be any passenger or commercial automobile such as a car, a truck, a sport utility vehicle, a crossover, a van, a minivan, a taxi, a bus, etc.

The vehicle 100 can include a frame 126 and a body 128. The vehicle 100 may be of a unibody construction, in which the frame 126 and the body 128 of the vehicle 100 are a single component. The vehicle 100 may, alternatively, be of a body-on-frame construction, in which the frame 126 supports the body 128 that is a separate component from the frame 126. The frame 126 and body 128 may be formed of any suitable material, for example, steel, aluminum, etc.

The body 128 can include body panels 130 partially defining an exterior of the vehicle 100. The body panels 130 may present a class-A surface, e.g., a finished surface exposed to view by a customer and free of unaesthetic blemishes and defects.

The cover 108 of the sensor assembly 102 is disposed on and mounted to one of the body panels 130. For example, the cover 108 can be disposed on a front end of the vehicle 100 below a beltline of the vehicle 100, as shown in FIG. 1. While the discussion below is with respect to a single sensor assembly 102, the vehicle 100 can include multiple sensor assemblies 102, each with one cover 108 disposed on one of the body panels 130. The covers 108 can be arranged to provide the first sensors 104 therein with a collective field of view entirely around a front end of the vehicle 100 or around an entirety of the vehicle 100.

Figure 2:
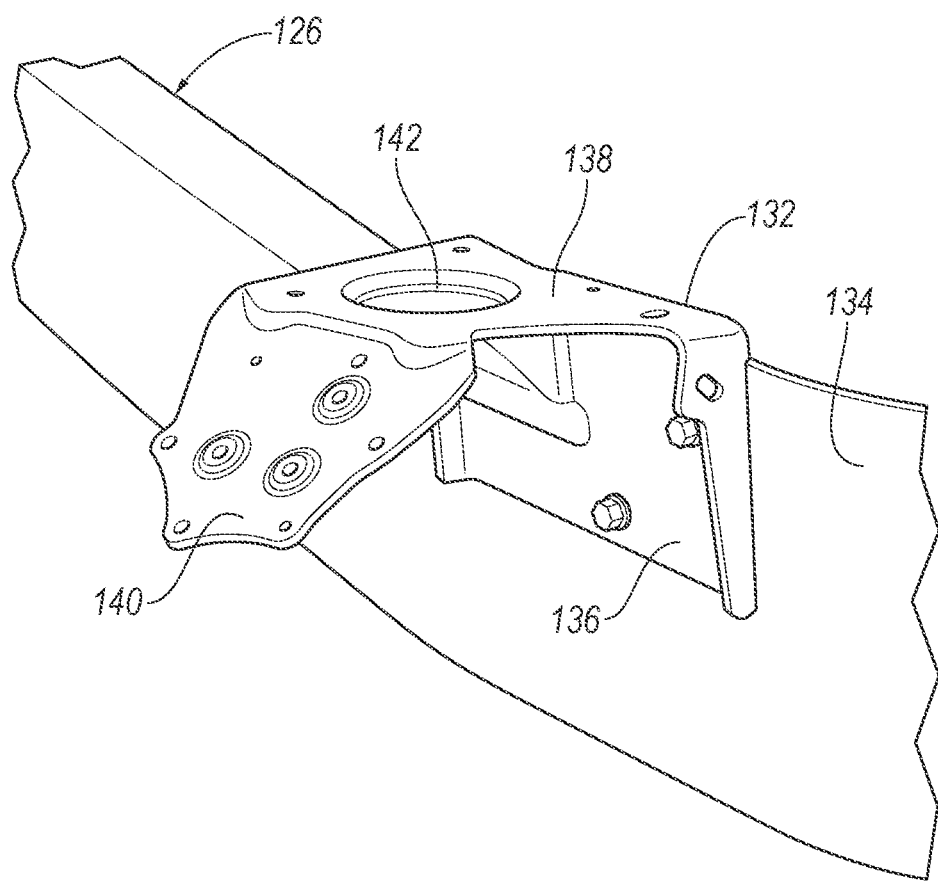
FIG. 2 is a perspective view of a bracket of one of the sensor assemblies attached to a frame of the vehicle.

With reference to FIG. 2, the sensor assembly 102 can include a bracket 132 and a frame member 134 of the frame 126. The bracket 132 can be fixed to the frame member 134, for example, welded or fastened, e.g., bolted, riveted, etc.

The bracket 132 can include a first panel 136, a second panel 138 extending from the first panel 136, and a third panel 140 extending from the second panel 138. The first panel 136, second panel 138, and third panel 140 can each be generally flat. The first panel 136 and second panel 138 can extend transverse to each other, and the second panel 138 and third panel 140 can extend transverse to each other. The first panel 136 can be spaced from the third panel 140. The first panel 136 can be fixed to the frame member 134, and the third panel 140 can be spaced from the frame member 134. The second panel 138 can include a bracket opening 142.

Figure 3:
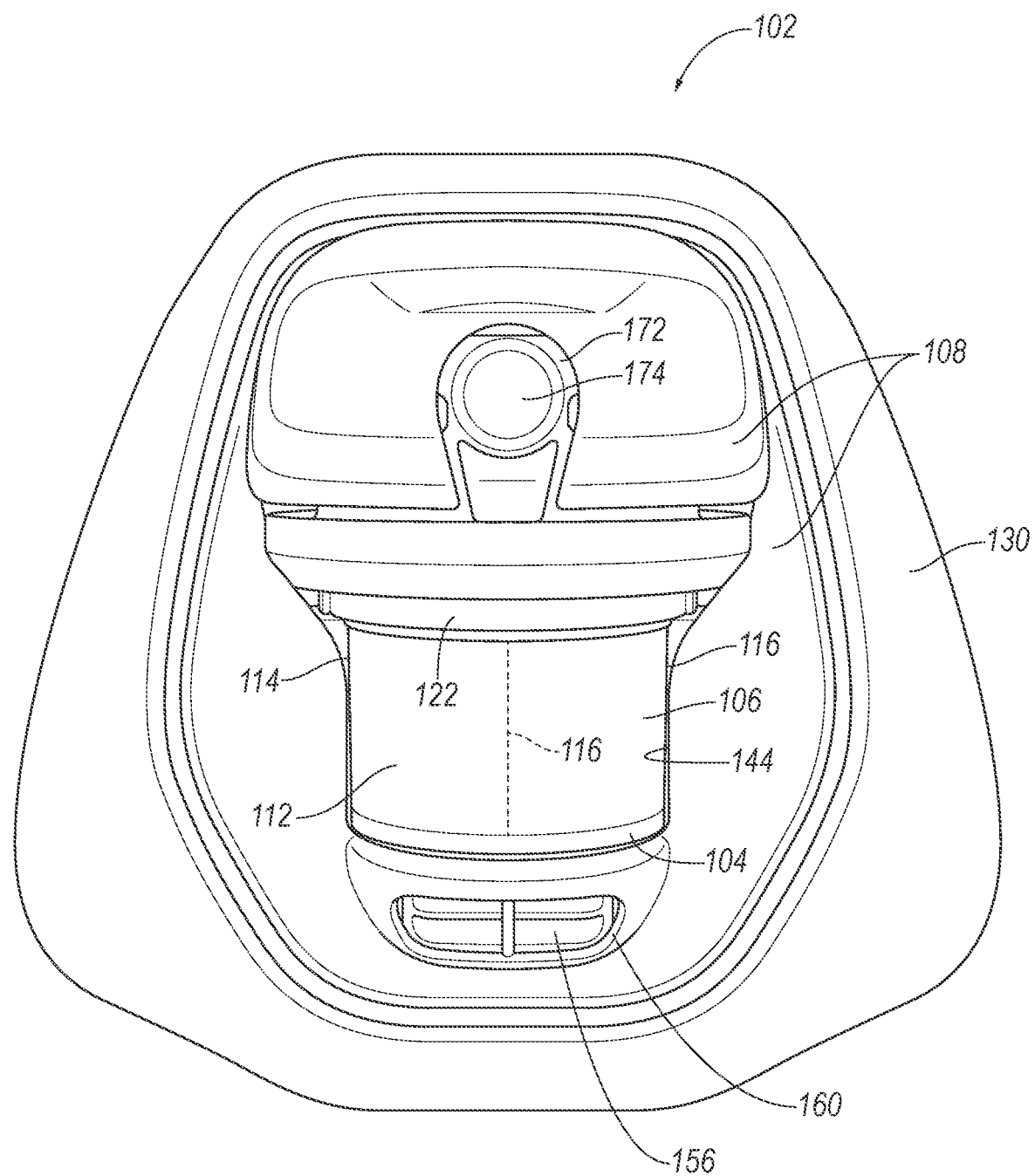
FIG. 3 is a front view of one of the sensor assemblies.
Figure 5:
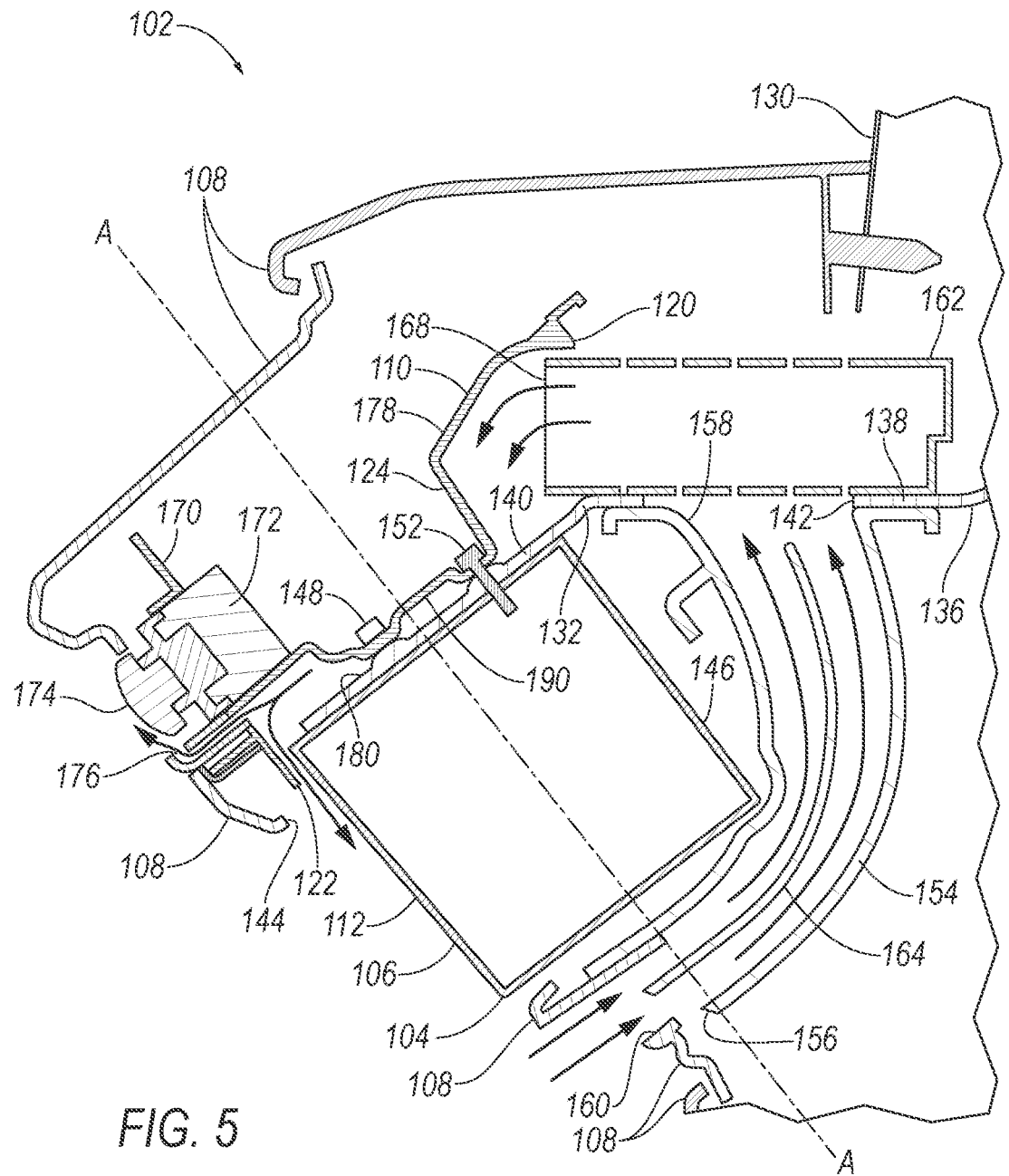
FIG. 5 is a side cross-sectional view of the sensor assembly.

With reference to FIG. 3, the sensor assembly 102 can include the cover 108 and one of the body panels 130 of the body 128. The cover 108 is fixed relative to the body panel 130 and extends from the body panel 130 in a direction away from the frame member 134, i.e., extends outward from the rest of the vehicle 100 (as shown in FIG. 5). The cover 108 may present a class-A surface, e.g., a finished surface exposed to view by a customer and free of unaesthetic blemishes and defects. The cover 108 may include one or multiple pieces, e.g., two pieces as shown in FIG. 5.

The cover 108 can be fixed relative to the first sensor 104. For example, the cover 108 can be attached to the body panel 130, e.g., snapped to the body panel 130, which is fixed relative to the frame member 134. The bracket 132 is fixed to the frame member 134, and the first sensor 104 is attached to the bracket 132, as described below.

The cover 108 can be positioned to expose the circumferential portion 112 of the sensor window 106 of the first sensor 104. For example, the cover 108 can include a cover opening 144, and the first sensor 104 can extend into the cover opening 144. The first sensor 104 can be positioned so that the first end 114 and second end 116 of the circumferential portion 112 are located at edges of the cover opening 144, so that the circumferential portion 112 faces outward from the vehicle 100 through the cover opening 144, and so that a remaining portion 146 of the sensor window 106 (shown in FIGS. 4-5) is behind the cover 108.

The first sensor 104 may detect the external world, e.g., objects and/or characteristics of surroundings of the vehicle 100, such as other vehicles, road lane markings, traffic lights and/or signs, pedestrians, etc. For example, the first sensor 104 may be a radar sensor, a scanning laser range finder, a light detection and ranging (LIDAR) device, an image processing sensor such as a camera, etc. In particular, the first sensor 104 may be a LIDAR device, e.g., a scanning LIDAR device. A LIDAR device detects distances to objects by emitting laser pulses at a particular wavelength and measuring the time of flight for the pulse to travel to the object and back.

The first sensor 104 includes the sensor window 106. The sensor window 106 can be oriented generally vertically, i.e., extends up and down. The sensor window 106 can be cylindrical and can define the axis A, which can be oriented generally vertically. The sensor window 106 can extend around the axis A. The sensor window 106 can extend fully around the axis A, i.e., 360°, or partially around the axis A, e.g., from the first end 114 to the second end 116, thereby including only the circumferential portion 112. The sensor window 106 can extend along the axis A from a bottom edge positioned at a bottom edge of the cover opening 144 to a top edge positioned at a top edge of the cover opening 144. At least some of the sensor window 106, e.g., the circumferential portion 112, can be transparent with respect to whatever medium the sensing device is capable of detecting. For example, if the first sensor 104 is a LIDAR device, then the sensor window 106 can be transparent with respect to visible light at the wavelength generated and detectable by the sensing device. The field of view of the sensing device extends through the sensor window 106.

The sensor window 106 includes the circumferential portion 112 and may include the remaining portion 146. The circumferential portion 112 can extend circumferentially relative to the axis A from the first end 114 adjacent to the cover 108, e.g., at an edge of the cover opening 144, to a second end 116 adjacent to the cover 108, e.g., at an opposite edge of the cover opening 144. The circumferential portion 112 can extend greater than 180° around the axis A. The circumferential portion 112 can include the midpoint 118 circumferentially between the first end 114 and the second end 116. The midpoint 118 is spaced from the first end 114 and the second end 116, e.g., equidistant from the first end 114 and the second end 116 in a plane orthogonal to the axis A. The remaining portion 146 can extend behind the cover 108 circumferentially relative to the axis A from the first end 114 to the second end 116.

Figure 4:
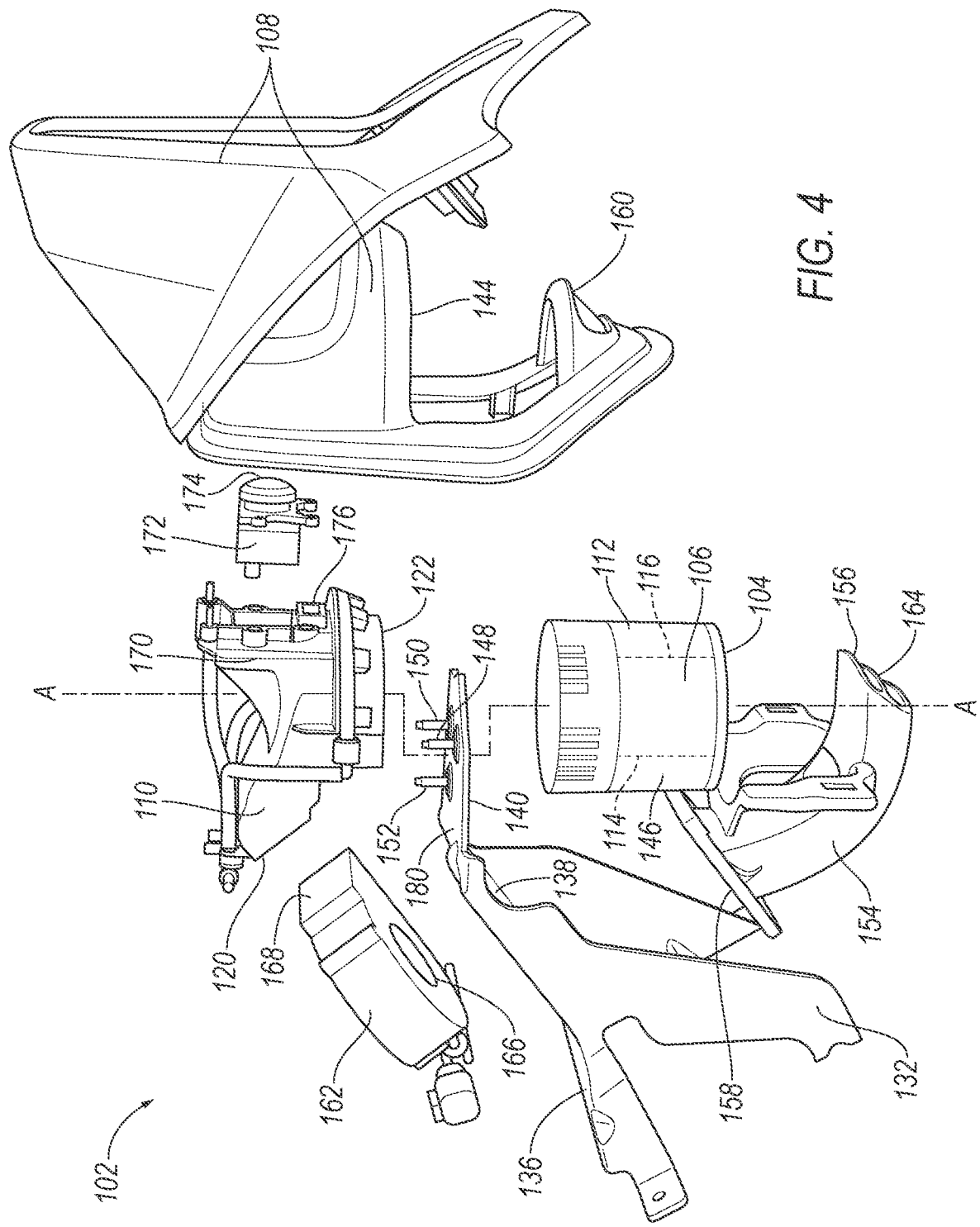
FIG. 4 is a perspective exploded view of the sensor assembly.

With reference to FIGS. 4 and 5, the first sensor 104 is fixed to the bracket 132, e.g., fastened to the bracket 132. For example, the first sensor 104 can be fastened to the third panel 140 of the bracket 132 by a plurality of fasteners 148, 150, 152, e.g., a first fastener 148, a second fastener 150, and a third fastener 152 (shown in FIG. 6). The first sensor 104 can hang below the third panel 140 of the bracket 132, i.e., can be positioned below the third panel 140 of the bracket 132 and be supported by the third panel 140 of the bracket 132. This position can reduce dimensional stackup by permitting more components to be attached to just one bracket 132.

The sensor assembly 102 can include a second duct 154 mounted to the bracket 132. For example, the second duct 154 can be fastened to the second panel 138 of the bracket 132.

The second duct 154 can extend from a second inlet 156 to a second outlet 158. The second inlet 156 can be positioned to draw airflow from outside the sensor assembly 102. For example, the second inlet 156 can be positioned at an intake port 160 of the cover 108. The intake port 160 can permit airflow through the cover 108. The second outlet 158 can be positioned to exhaust airflow into a blower 162 (described below). For example, the second outlet 158 can be positioned adjacent and concentric to the bracket opening 142 and positioned to exhaust airflow through the bracket opening 142.

The second duct 154 can have a smoothly curving shape from the second inlet 156 to the second outlet 158, i.e., a shape without sharp corners. The second duct 154 can have a constant cross-sectional area from the second inlet 156 to the second outlet 158. The shape and/or cross-sectional area can help promote laminar airflow reaching the blower 162, which allows a greater quantity of air to reach the blower 162 for greater output by the blower 162. The second duct 154 can extend through the axis A defined by the sensor window 106 on an opposite side of the first sensor 104 as the third panel 140 of the bracket 132 to which the first sensor 104 is fastened; i.e., the second duct 154 can extend through the axis A below the first sensor 104.

The second duct 154 can include a vane 164 bisecting the duct from the second inlet 156 to the second outlet 158. The vane 164 can divide the second duct 154 into two channels having equal cross-sectional area as each other from the second inlet 156 to the second outlet 158. The vane 164 can extend horizontally across the cross-section of the second duct 154. The vane 164 can help promote laminar airflow reaching the blower 162 for greater output by the blower 162.

The blower 162 increases the pressure of a gas by reducing a volume of the gas or by forcing additional gas into a constant volume. The blower 162 may be any suitable type, e.g., positive-displacement such as a reciprocating, ionic liquid piston, rotary screw, rotary vane, rolling piston, scroll, or diaphragm; dynamic such as an air bubble, centrifugal, diagonal, mixed-flow, or axial-flow; or any other suitable type.

The blower 162 is mounted to the bracket 132. For example, the blower 162 can be fastened to the second panel 138 of the bracket 132 on an opposite side as the second duct 154.

The blower 162 is positioned to draw air from the second duct 154 and blow air into the first duct 110. For example, the blower 162 can include a blower inlet 166 positioned adjacent and concentric to the bracket opening 142 on an opposite side of the second panel 138 from the second outlet 158 of the second duct 154, so as to receive airflow from the second outlet 158 through the bracket opening 142. The blower 162 can include a blower outlet 168 positioned adjacent to the first inlet 120 of the first duct 110, so that airflow exhausted from the blower 162 through the blower outlet 168 enters the first duct 110 through the first inlet 120.

The first duct 110 is mounted to the first sensor 104. For example, the first duct 110 can be fastened to the first sensor 104 through the bracket 132, e.g., the third panel 140 of the bracket 132. The first duct 110 can be positioned on an opposite side of the third panel 140 of the bracket 132 as the first sensor 104, i.e., the bracket 132 can be positioned between the first sensor 104 and the first duct 110, e.g., directly between the first sensor 104 and the first duct 110, e.g., between the first sensor 104 and the first duct 110 along the axis A. The first duct 110 and the bracket 132 can extend through the axis A on top of the first sensor 104.

The sensor assembly 102 includes the first fastener 148, the second fastener 150, and the third fastener 152. The first fastener 148, second fastener 150, and third fastener 152 can fix the first sensor 104 and the first duct 110 to the bracket 132. For example, the first fastener 148, second fastener 150, and third fastener 152 can extend through the first duct 110 and through the bracket 132 into the first sensor 104.

The sensor assembly 102 can include a second-sensor frame 170 for a second sensor 172. For example, the first duct 110 can include the second-sensor frame 170, e.g., the second-sensor frame 170 can be integral with the first duct 110, i.e., made of a single, uniform piece of material with no seams, joints, fasteners, or adhesives holding it together. The second-sensor frame 170 can extend upward from the first duct 110, i.e., in a direction along the axis A away from the bracket 132 and the first sensor 104.

The sensor assembly 102 includes the second sensor 172. The second sensor 172 may detect the external world, e.g., objects and/or characteristics of surroundings of the vehicle 100, such as other vehicles, road lane markings, traffic lights and/or signs, pedestrians, etc. For example, the second sensor 172 may be a radar sensor, a scanning laser range finder, a light detection and ranging (LIDAR) device, an image processing sensor such as a camera, etc. In particular, the second sensor 172 can be a camera and can detect electromagnetic radiation in some range of wavelengths. For example, the second sensor 172 may detect visible light, infrared radiation, ultraviolet light, or some range of wavelengths including visible, infrared, and/or ultraviolet light. For example, the camera can be a charge-coupled device (CCD), complementary metal oxide semiconductor (CMOS), or any other suitable type. The second sensor 172 can include a sensor lens 174.

The second sensor 172 can be mounted to the bracket 132. For example, the second sensor 172 can be fixed to, e.g., snapped into, the second-sensor frame 170 of the first duct 110, and the first duct 110 can be fastened to the third panel 140 of the bracket 132. The second sensor 172 can be positioned on an opposite side of the bracket 132, e.g., on an opposite side of the third panel 140 of the bracket 132 along the axis A, from the first sensor 104.

The first duct 110 extends from the first inlet 120 to the first outlet 122 and to a second-sensor outlet 176. The first duct 110 defines an airflow path from the first inlet 120 to the first outlet 122 and the second-sensor outlet 176. The first duct 110 extends through the axis A. The first inlet 120 is positioned to receive airflow from the blower 162. The first outlet 122 is positioned to direct airflow across the circumferential portion 112 of the sensor window 106. The first outlet 122 can direct airflow in a downward direction generally parallel to the axis A from the top edge of the circumferential portion 112 toward the bottom edge of the circumferential portion 112. The second-sensor outlet 176 can be positioned to direct airflow to the second sensor 172, e.g., across the sensor lens 174. The second-sensor outlet 176 can direct airflow in an upward direction generally parallel to the axis A.

The first duct 110 includes the deflector 124. The deflector 124 can extend downward relative to the axis A from a top panel 178 of the first duct 110 to a top surface 180 of the third panel 140 of the bracket 132. The top panel 178 of the deflector 124 can include a gap circumscribed by the deflector 124. The first fastener 148, second fastener 150, and third fastener 152 can extend through a bottom panel 190 of the deflector 124 circumscribed by the deflector 124. The deflector 124 thereby permits access to the fasteners 148, 150, 152 during assembly.

Figure 6:
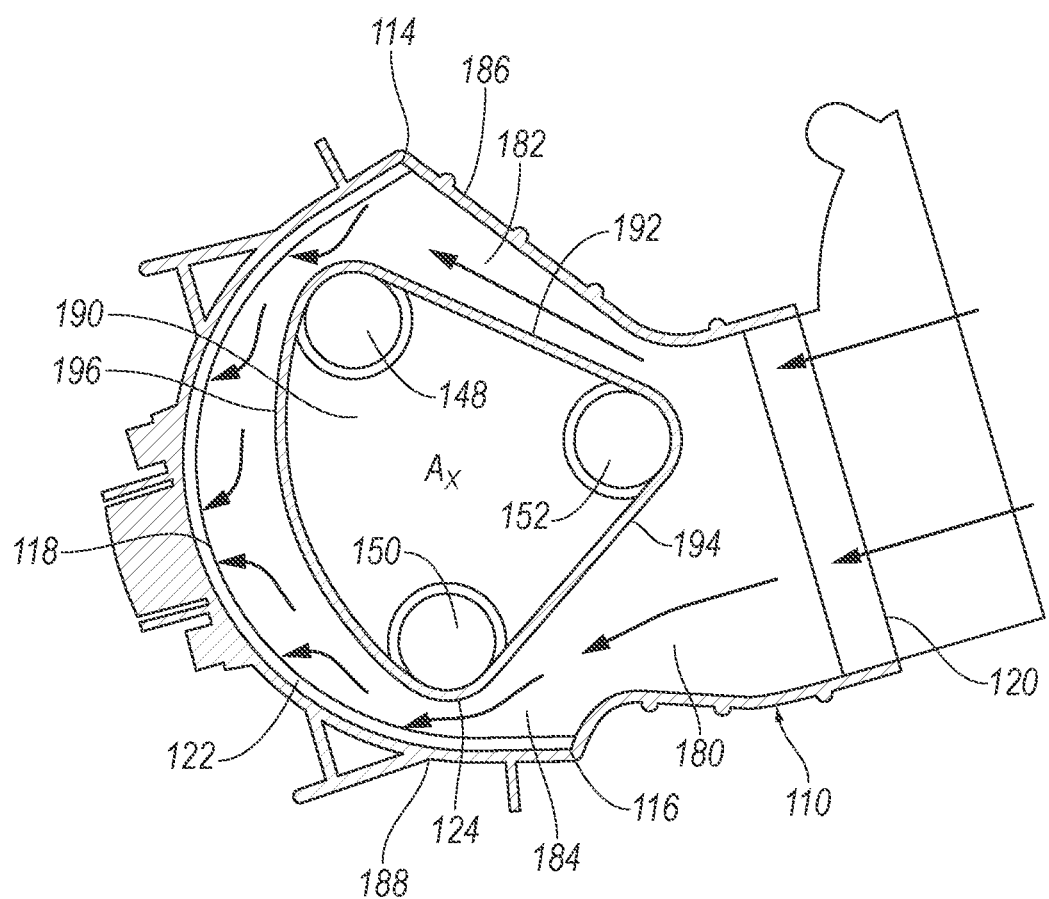
FIG. 6 is a top cross-sectional view of a first duct of the sensor assembly.

With reference to FIG. 6, the first outlet 122 can extend circumferentially around the axis A from the first end 114 of the circumferential portion 112 to the second end 116 of the circumferential portion 112. The first outlet 122 can extend circumferentially greater than 180°. The first outlet 122 can have a constant width, i.e., measured radially relative to the axis A, from the first end 114 to the second end 116 of the circumferential portion 112.

The first fastener 148, the second fastener 150, and the third fastener 152 can extend through the first duct 110, e.g., through the bottom panel 190 of the deflector 124, within an area circumscribed by the deflector 124. The first fastener 148, the second fastener 150, and the third fastener 152 can be arranged in a triangle, i.e., not collinearly. The third fastener 152 can be positioned closer to the first outlet 122 than the first fastener 148 and second fastener 150 are.

The deflector 124 is positioned to direct airflow from the first inlet 120 to the first outlet 122 at the first end 114 and second end 116 of the circumferential portion 112 before the airflow reaches the midpoint 118 of the circumferential portion 112. For example, the deflector 124 can divide the first duct 110 into a first branch 182 and a second branch 184. The first branch 182 can extend along the deflector 124 to the first end 114 of the circumferential portion 112 and then circumferentially to the midpoint 118 of the circumferential portion 112. The second branch 184 can extend along the deflector 124 to the second end 116 of the circumferential portion 112 and then circumferentially to the midpoint 118 of the circumferential portion 112.

The deflector 124 can be positioned to direct the airflow from the first inlet 120 around the fasteners 148, 150, 152. The deflector 124 can include a first flat side 192 extending from the third fastener 152 to the first fastener 148. The deflector 124 can include a second flat side 194 extending from the third fastener 152 to the second fastener 150. The deflector 124 can include a third side 196 curving circumferentially around the axis A from the first flat side 192 to the second flat side 194, i.e., from the first fastener 148 to the second fastener 150. The first flat side 192, the second flat side 194, and the third side 196 of the deflector 124 can be connected together in a loop around the fasteners 148, 150, 152.

The first branch 182 can be formed of the top panel 178 above, the top surface 180 of the bracket 132 below, a first lateral wall 186 of the first duct 110 radially outward relative to the axis A, and the first flat side 192 and part of the third side 196 of the deflector 124 radially inward relative to the axis A. Having airflow directly across the top surface 180 of the bracket 132 can help carry away heat generated by the first sensor 104. The first flat side 192 is positioned to direct airflow from the first inlet 120 to the first outlet 122 at the first end 114 of the circumferential portion 112 before the airflow reaches the midpoint 118 of the circumferential portion 112. For example, the first end 114 of the circumferential portion 112 is partway along the first branch 182, and the midpoint 118 is at an end of the first branch 182. Once the airflow reaches the first end 114 of the circumferential portion 112, the airflow is split between exiting through the first outlet 122 and moving toward the midpoint 118. The deflector 124 can thus help significant airflow reach the first end 114 of the circumferential portion 112 of the sensor window 106, rather than the airflow being directed primarily toward the midpoint 118 as might occur in the absence of the deflector 124.

The second branch 184 can be formed of the top panel 178 above, the top surface 180 of the bracket 132 below, a second lateral wall 188 of the first duct 110 radially outward relative to the axis A, and the second flat side 194 and part of the third side 196 of the deflector 124 radially inward relative to the axis A. The second flat side 194 is positioned to direct airflow from the first inlet 120 to the first outlet 122 at the second end 116 of the circumferential portion 112 before the airflow reaches the midpoint 118 of the circumferential portion 112. For example, the second end 116 of the circumferential portion 112 is partway along the second branch 184, and the midpoint 118 is at an end of the second branch 184. Once the airflow reaches the second end 116 of the circumferential portion 112, the airflow is split between exiting through the first outlet 122 and moving toward the midpoint 118. The deflector 124 can thus help significant airflow reach the second end 116 of the circumferential portion 112 of the sensor window 106, rather than the airflow being directed primarily toward the midpoint 118 as might occur in the absence of the deflector 124.

The disclosure has been described in an illustrative manner, and it is to be understood that the terminology which has been used is intended to be in the nature of words of description rather than of limitation. The adjectives "first," "second," and "third" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A sensor assembly comprising:
a sensor including a cylindrical sensor window defining an axis;
a cover fixed relative to the sensor, the cover being positioned to expose a circumferential portion of the sensor window, the circumferential portion extending circumferentially relative to the axis from a first end adjacent to the cover to a second end adjacent to the cover, the circumferential portion including a midpoint circumferentially between the first end and the second end;
a duct mounted to the sensor and extending through the axis, the duct including an inlet and an outlet, the outlet extending circumferentially from the first end of the circumferential portion to the second end of the circumferential portion, the duct including a deflector positioned to direct airflow from the inlet to the outlet at the first end and second end of the circumferential portion before the airflow reaches the midpoint of the circumferential portion;

a bracket; and a plurality of fasteners fixing the sensor and the duct to the bracket;

wherein the fasteners extend through the duct;

the deflector is positioned to direct the airflow around the fasteners; and the fasteners include a first fastener, a second fastener, and a third fastener, the deflector includes a first flat side extending from the third fastener to the first fastener and positioned to direct airflow to the outlet at the first end of the circumferential portion before the airflow reaches the midpoint of the circumferential portion, and the deflector includes a second flat side extending from the third fastener to the second fastener and positioned to direct airflow to the outlet at the second end of the circumferential portion before the airflow reaches the midpoint of the circumferential portion.

2. The sensor assembly of claim 1, wherein the bracket extends through the axis, and the bracket is positioned between the sensor and the duct along the axis.

3. The sensor assembly of claim 2, wherein the sensor is a first sensor, and the outlet is a first outlet, the sensor assembly further comprising a second sensor mounted to the bracket, wherein the duct includes a second outlet positioned to direct airflow to the second sensor.

4. The sensor assembly of claim 3, wherein the second sensor is positioned on an opposite side of the bracket from the first sensor.

5. The sensor assembly of claim 3, wherein the second sensor includes a sensor lens, and the second outlet is positioned to direct airflow across the sensor lens.

6. The sensor assembly of claim 1, further comprising a blower mounted to the bracket and positioned to blow air into the inlet of the duct.

7. The sensor assembly of claim 6, wherein the duct is a first duct, the sensor assembly further comprising a second duct, wherein the blower is positioned to draw air from the second duct.

8. The sensor assembly of claim 7, wherein the second duct is mounted to the bracket.

9. The sensor assembly of claim 1, wherein the deflector includes a third side curving circumferentially from the first flat side to the second flat side.

10. The sensor assembly of claim 1, further comprising a blower positioned to blow air into the inlet of the duct.

11. The sensor assembly of claim 10, wherein the duct is a first duct, the sensor assembly further comprising a second duct, wherein the blower is positioned to draw air from the second duct.

12. The sensor assembly of claim 11, wherein the inlet is a first inlet, the outlet is a first outlet, the second duct extending from a second inlet to a second outlet, and the second outlet is positioned to exhaust airflow into the blower.

13. The sensor assembly of claim 12, wherein the second duct has a smoothly curving shape from the second inlet to the second outlet.

14. The sensor assembly of claim 12, wherein the second duct includes a vane bisecting the duct from the second inlet to the second outlet.

15. The sensor assembly of claim 11, wherein the second duct extends through the axis on an opposite side of the sensor as the first duct extends through the axis.

* * * * *